(12) United States Patent
Teune

(10) Patent No.: US 8,457,917 B2
(45) Date of Patent: Jun. 4, 2013

(54) DEVICE AND METHOD FOR SETTING OUT CONTOURS, POINTS OR WORKS AND A GUIDING DEVICE FOR USE THEREWITH

(75) Inventor: Dick Teune, Nuenen (NL)

(73) Assignee: Holding Prodim Systems B.V., Helmond (NL)

( * ) Notice: Subject to any disclaimer, the term of this patent is extended or adjusted under 35 U.S.C. 154(b) by 573 days.

(21) Appl. No.: 12/700,891

(22) Filed: Feb. 5, 2010

(65) Prior Publication Data
US 2010/0198543 A1 Aug. 5, 2010

(30) Foreign Application Priority Data

Feb. 5, 2009 (NL) .................................... 1036517

(51) Int. Cl.
*G06F 19/00* (2011.01)
(52) U.S. Cl.
USPC ............... 702/95; 702/94; 702/150; 702/151; 702/152; 175/45; 324/326; 340/853.4; 33/763; 33/1 N; 33/756; 33/545; 33/503; 33/702
(58) Field of Classification Search
USPC ................ 702/95, 94, 150, 151, 152; 175/26, 175/45, 61, 62; 324/326, 690, 334, 338; 340/853.3, 854.4, 853.5, 853.6; 343/866, 343/867; 33/763, 1 N, 756, 761, 551.5, 545, 33/553, 555, 572, 503, 702
See application file for complete search history.

(56) References Cited

U.S. PATENT DOCUMENTS

| | | | | |
|---|---|---|---|---|
| 4,976,043 A | * | 12/1990 | Bieg | 33/551 |
| 5,208,995 A | * | 5/1993 | McKendrick | 33/567 |
| 5,320,180 A | * | 6/1994 | Ruley et al. | 175/26 |
| 5,363,926 A | * | 11/1994 | Mizuno | 175/45 |
| 5,469,155 A | * | 11/1995 | Archambeault et al. | 340/853.4 |
| 5,585,726 A | * | 12/1996 | Chau | 324/326 |
| 5,711,381 A | * | 1/1998 | Archambeault et al. | 175/45 |
| 5,767,678 A | * | 6/1998 | Mercer | 324/326 |
| 5,768,792 A | * | 6/1998 | Raab | 33/503 |
| 5,880,680 A | * | 3/1999 | Wisehart et al. | 340/853.4 |
| 6,102,136 A | * | 8/2000 | Archambeault et al. | 175/45 |
| 6,279,668 B1 | * | 8/2001 | Mercer | 175/45 |
| 6,411,094 B1 | * | 6/2002 | Gard et al. | 324/326 |
| 6,417,666 B1 | * | 7/2002 | Mercer | 324/326 |
| 6,427,784 B1 | * | 8/2002 | Archambeault et al. | 175/45 |
| 6,484,118 B1 | * | 11/2002 | Govari | 702/150 |
| 6,785,973 B1 | * | 9/2004 | Janssen | 33/1 N |
| 6,854,535 B1 | * | 2/2005 | Mizuno | 175/62 |
| 7,246,030 B2 | * | 7/2007 | Raab et al. | 702/152 |
| 7,765,708 B2 | * | 8/2010 | Hellier | 33/503 |

FOREIGN PATENT DOCUMENTS

| | | |
|---|---|---|
| EP | 1 156 298 A2 | 11/2001 |
| EP | 0 717 261 A2 | 6/2010 |
| NL | 1013479 | 7/2001 |
| WO | WO 2008/067349 A2 | 6/2008 |

* cited by examiner

*Primary Examiner* — Carol Tsai
(74) *Attorney, Agent, or Firm* — Oblon, Spivak, McClelland, Maier & Neustadt, L.L.P.

(57) ABSTRACT

A device, a method and a guiding device for setting out contours, points or works, including a computer-controlled measuring device provided with a movable measuring probe and a portable base unit provided with a rotatably supported elongate arm. The measuring probe is connected to the measuring device by means of a cord or a wire via the elongate arm, and the measuring device is provided with sensors for measuring a length or a change in the length of the cord or the wire and rotation of the arm in at least one degree of freedom for providing position data of the measuring probe.

35 Claims, 6 Drawing Sheets

DEVICE AND METHOD FOR SETTING OUT CONTOURS, POINTS OR WORKS AND A GUIDING DEVICE FOR USE THEREWITH

TECHNICAL FIELD

The present invention generally relates to the setting out in a space or on objects of contours or points of windows, doors, shafts, ducts, the course of water conduits and/or electrical conduits or of a sewer system or a drainage system in a building, or the setting out of works, such as buildings, factories, interior walls, etc, as well as production moulds in a factory and machining positions on products or objects and the like.

BACKGROUND

In practice, such contours, points or works are prepared on the basis of various working drawings and construction drawings. Based on these drawings, the contours, points and/or works in question are subsequently set out or marked out on an object or in a three-dimensional space for realising the same.

Optical or laser-controlled levelling instruments and the like are traditionally used for relatively large-sized projects, such as bridges, flyovers, parks or large buildings, wherein the contour, point or work to be realised is marked out in the space on the basis of one or more reference points in the space, for example pegs set out by a land surveying organisation.

The traditional way of setting out contours, points or works, using an optical levelling instrument, staffs and measuring tape is time-consuming in practice, especially when setting out complex, non-straight contours in a vertical, inclined or curved plane and in the case of works with a relatively great variation in height. Because at least two persons having specialist knowledge are needed, this is a rather costly method of working.

In practice, the accuracy of projects carried out by means of optical or laser-controlled equipment is to a high degree influenced by ambient conditions, such as the incidence of light, shadow effects, temperature, etc. In order to obtain a sufficiently accurate result, a number of measurements are carried out for every point, which is not conducive to realising a high working speed when using such equipment.

For relatively small projects, for example in the order of up to a few metres, such as the setting out in a space or on objects of contours or points of windows, doors, shafts, ducts, the course of water conduits and/or electrical conduits or of a sewer system or a drainage system in a building, of works such as production moulds in a factory and machining positions, such as holes to be drilled or grooves to be milled, on products or objects and the like, it is generally not possible to use laser-controlled levelling instruments, because of the relatively large dimensions of such instruments, which necessitate frequent repositioning and recalibration of the instruments, for example when setting out contours or points in a relatively small space, but also because of their limited precision and the aforesaid effect of ambient conditions on the measurement.

From European patent No. 1 226 401 and the subsequent U.S. Pat. No. 7,395,609 B2 measuring devices for measuring the position of a movable measuring probe in two or three independent coordinates are known. These known measuring devices are based on the same measuring principle and comprise a base unit in which the movable measuring probe is connected to a measuring device incorporated in the base unit via a cord or a wire and a rotatably supported elongate arm. The measuring device is provided with sensors for measuring a length or a change in the length of the cord or the wire and rotation of the arm in at least one degree of freedom while the measuring probe is being moved. A computer-controlled processing device connected to the sensors processes the measuring signals delivered by the sensors into position data of the measuring probe and makes these data available on a communication interface.

The measuring apparatuses known from European patent No. 1 226 401 are marketed in a two-dimensional measuring version or in a three-dimensional measuring version under the trade name Proliner® by the Assignee of the present patent application. The Proliner® is capable of measuring the (spatial) position of individual points at a high speed and with a high degree of precision. The measuring apparatuses have a handy size, they can be installed in a very short time and they are very user-friendly. Using the Proliner®, also non-expert users are able to measure complex contours and works in the order of a few metres in a quick and accurate manner.

SUMMARY

The object of the invention is to adapt the above-described known measuring devices for use in setting out contours, points or works as well, so that the setting out can take place in a more convenient, more precise, more versatile and more efficient manner than is possible with the known levelling instruments as described in the foregoing.

According to a first aspect there is provided a device for setting out contours, points or works, comprising a measuring device provided with a movable measuring probe and a portable base unit provided with a rotatably supported elongate arm, which measuring probe is connected to the measuring device by means of a cord or a wire via the elongate arm. The measuring device is provided with sensors for measuring a length or a change in the length of the cord or the wire and rotation of the arm in at least one degree of freedom, and with a computer-controlled processing device connected to the sensors for processing measuring signals delivered by the sensors into position data of the measuring probe. The invention further comprises a guiding device communicatively connected to the measuring device for providing guidance regarding the positioning of the measuring probe for the purpose of reducing a difference between a measured position of the measuring probe and a desired position of the measuring probe in accordance with a contour, point or work to be set out. The guiding device is provided with an indicating device indicating guidance for moving the measuring probe on the basis of a difference between a position of the measuring probe measured by the measuring device and a desired position of the measuring probe in accordance with a contour, point or work to be set out.

The invention is based on the perception that the setting out of contours, points and/or works extending in a two- or three-dimensional space can take place in a simpler and easier and thus more efficient manner when use is made of the known measuring devices, such as the Proliner® or the measuring device known from the subsequent U.S. Pat. No. 7,395,609 B2, which is based on the same measuring principle as the Proliner®, in combination with a guiding device according to the invention, so that a user can be guided to a desired position of the measuring probe in an easy, quick and efficient manner.

Because the position of the measuring probe is directly measured in at least two independent coordinates and because the difference between the current position of the measuring probe and the desired position of the measuring probe is directly available in at least two independent coordinates, the measuring probe can be placed at any position that corresponds to a position of the contour, the point or the work to be set out on the basis of the guidance provided by the guiding device, and in the case of three-dimensional projects without any additional height measurements in relation to a horizontal measuring plane or the like being required.

The user is not required to have specialist knowledge in order to be able to interpret the guidance or directions provided in relation to, for example, a measuring plane. Nor is the user required to have any knowledge regarding the carrying out of height measurements, for example, or to have prior knowledge regarding the contour, a point or a work to be set out, or even to be able to read design drawings or construction drawings.

The new device thus makes it possible to have contours, points or works set out on an object or in the space by non-specialist users. In particular in the case of objects having dimensions in the order of a few metres. It will be understood that a further cost saving can be realised in this way. Because an additional position determination of the measuring probe other than the position measured by the measuring device is not required, either, a single user of the device according to the invention can work significantly more quickly in comparable situations than is possible with the prior art methods, which make use of laser-controlled levelling instruments with a horizontal reference plane.

In an embodiment of the device, the measuring device comprises a storage device for loading and storing data representative of a contour, point or work to be set out therein, and a calculating device for calculating the difference between the position of the measuring probe as measured by the measuring device and the desired position of the measuring probe in accordance with the loaded data of the contour, the point or the work to be set out.

In this embodiment advantageous use can furthermore be made of a storage device that is already present in the device and a computer-controlled calculating device, such as a microprocessor or the like.

In another embodiment, the guiding device is incorporated in the measuring device.

In another embodiment of the device, the guiding device comprises a storage device for loading and storing data representative of a contour, point or work to be set out therein, and a calculating device for calculating the difference between the position of the measuring probe as measured by the measuring device and the desired position of the measuring probe in accordance with the data loaded in the storage device of the contour, the point or the work to be set out.

This embodiment provides for the loading of data for setting out a contour, point or work into the guiding device. Since the guiding device and the measuring device are communicatively coupled, the calculation of the difference between the current position of the measuring probe as measured by the measuring device and the desired position of the measuring probe can be carried out by a calculating device in the guiding device. The measuring device as such need not be adapted in that case, so that advantageous use can be made of commercially available measuring devices comprising usual software for measuring the position of the measuring probe in two or three independent spatial coordinates, as described above.

In a further embodiment, the guiding device is communicatively coupled to the measuring device by wireless means, and being movable with respect to the measuring device. To make the exchange of data between the measuring device and a guiding device communicatively coupled thereto possible, the measuring device and the guiding device may be provided with suitable transceivers for wireless data exchange, such as radio, infrared, ultrasonic and the like, for example operative via wireless short-range communication technology, such as the technology known as "Bluetooth", etc.

The guiding device may essentially have any suitable form for giving direct guidance or direction information to a user for moving the measuring probe to a desired position. The guiding device may be entirely audio-controlled, for example, with the audio information providing guidance in the form of tones of varying frequency or duration or rhythm or spoken texts regarding the movement of the measuring probe in one or more directions. In an optical embodiment, use may be made of optical direction information in the form of lamps or lamp panels or Light Emitting Diodes (LEDs), with graphic direction information, such as direction arrows, whose shape or representation, for example, changes in dependence on the distance to be covered or, for example, uniform arrows with added distance information displayed in digits or otherwise in a spatial coordinate system. In the case of a movable or portable guiding device, use may also be made of tactile direction information, for example using a vibration device that produces vibrations dependent on, for example, the guidance being given as regards the direction.

In an embodiment, the indicating device of the guiding device is provided with a graphic display screen, being designed for displaying an image representing the cord or the wire on the display screen in use and for displaying the guidance for moving the measuring probe in relation to this image.

The representation of the cord or the wire is a straight line, for example, which has a fixed position on the display screen. One end of the line may in that case coincide with or blend into a representation of the measuring probe on the display screen, for example in the form of a dot or a cross. The displacement guidance are direction indications, for example an arrow, which, based on the representation of the cord or the wire, such as the aforesaid straight line, indicates the direction of movement of the measuring probe towards the desired point. In addition to that, displacement information may also be displayed in a unit of measurement, such as mm, cm, m, degrees, using digits or graphic representations, such as measuring bars, for example.

During the process of setting out, the user can then readily determine the extent and the direction of the displacement of the measuring probe and may carry out this displacement, for example, by aligning the representation of the cord or the wire displayed on the display screen with the actual cord or wire of the measuring device.

In a more advanced embodiment, the device comprises a position determining device for determining a relative position of the guiding device with respect to at least one of the base unit and the measuring probe of the measuring device, wherein the indicating device of the guiding device is provided with a graphic display screen for displaying the guidance on the display screen in relation to the determined relative position.

By determining the relative position of the guiding device with respect to either the measuring probe or the base unit of the measuring device continuously or quasi-continuously in real time during setting out it is possible to align the directions displayed on the display screen automatically, dynamically with, for example, the cord or the wire of the measuring device, so that the user need not place the guiding device in a position aligned with the wire himself all the time for correctly interpreting the direction information being displayed. The direction information will in that case also follow position changes of the guiding device, of course, when the user holding the guiding device changes the direction in which he or she is moving or the orientation of the guiding device, etc.

The relative position can be measured in various ways known to the skilled person or by using known techniques. For example, from absolute position measurements of the base unit and the guiding device by means of satellite position determining systems, for example, by means of position measuring systems incorporated in the base unit and/or in the guiding device, which communicate with each other, by means of triangulation techniques, etc.

In an embodiment, the indicating device of the guiding device is provided with a graphic display screen for providing the guidance on this display screen in relation to an image of a contour, point or work to be set out. Furthermore, in an embodiment the indicating device of the guiding device is provided with a graphic display screen for providing the guidance on this display screen in relation to reference positions of a contour, point or work to be set out. On such a display screen, also the current measured position of the measuring probe can be advantageously displayed, for example in the form of a dot, a cross, a sphere or the like.

By loading the data of the contour, point or the work to be set out into the guiding device, the directions for moving the measuring probe can readily be directly indicated in a representation of or reference to the space or the object in which or on which the contour or the point is to be set out or of the work that is to be set out. This increases the ease of use of the device even further, because the user is given a clear image of the contour, the point or the work to be set out in relation to the space in which he or she is present. The information for moving the measuring probe may also implicitly follow from the distance of the current position of the measuring probe as displayed on the display screen to the contour, the point or the work to be set out as displayed on the display screen.

It is noted that the guidance need not necessarily be indicated in the same coordinate system as the data of the contour, point or the work to be set out. That is, the data may refer to a Cartesian coordinate system, for example, whilst the guidance to a point or the representation of a contour or work on the guiding device are indicated in cylindrical coordinates, for example, or refer thereto, or conversely. Cylindrical coordinates are useful in setting out contours in tunnels or the like, for example.

In another embodiment, the indicating device of the guiding device is therefore designed for giving the guidance in a coordinate system that is to be selected.

In an embodiment, in order to facilitate the process of setting out even further, the guidance in a three-dimensional project, i.e. when setting out a contour, point or work in three dimensions, are indicated in two independent directions in a two-dimensional partial representation of a contour, point or a work to be set out.

In the above example of setting out a contour on, for example, a curved wall of a tunnel, the setting out is facilitated if the tunnel wall in question is represented as a flat surface, because the user will perceive this wall as a flat surface when standing in front of such a wall.

Note, the measuring device measures the movements of the measuring probe in three independent coordinates, whilst the guidance to a user for moving the measuring probe, for example for setting out a contour, are given in two independent directions on the two-dimensional partial representation.

The guiding device may be so designed that a switchover from, for example, a three-dimensional representation to a two-dimensional partial representation will take place automatically, for example when the measuring probe reaches a switchover point contained in the loaded data of the contour or the work to be set out.

In yet another embodiment, the guiding device comprises a signalling device, such as an optical, acoustic or vibrating signalling device, for example, for signalling to the user that the calculated difference is lower than a predetermined threshold value. This threshold value may be selected in accordance with the measuring tolerance of the measuring device, for example, or in accordance with the desired tolerance for a particular project, i.e. a contour, point or a work to be set out. If the calculated difference is lower than the predetermined threshold value, it can be assumed that the current position of the measuring probe corresponds to the desired position of the measuring probe.

If the current position of the measuring probe corresponds to the desired position, the device can automatically generate a new desired position of the measuring probe in accordance with the contour, the point of the work to be set out.

In another embodiment of the device, the guiding device comprises a device for confirming a position reached by the measuring probe, and a device for selecting a desired spatial position of the measuring probe in accordance with the contour, the point or the work to be set out.

The confirmation and selection of a position of the measuring probe can take place, for example, by operating (a) hard or soft (software) key(s) on the guiding device, and preferably by indicating a respective position, for example in a representation of the contour, the point of the work displayed on a display screen of the guiding device, for example by means of a cursor on the display screen, or physically, using a touch pen or the like, as is known per se in the prior art. The guiding device may be configured so that confirmation is needed first, for example, before a new position can be selected.

In an embodiment of the device, the measuring probe and the guiding device are combined into one portable, movable unit. This has the advantage that the user only needs to use one hand for moving the measuring probe and operating the guiding device. The user's other hand will in that case remain free for providing support, for example at places which are difficult to reach, or for placing physical marks, such as chalk lines or paint lines, placing pegs and the like for the contour, the point or the work to be set out.

It is noted that there is also provided an embodiment in which the computer-controlled processing device for processing measuring signals delivered by the sensors into position data of the measuring probe is incorporated in the guiding device, and in which the guiding device is designed for indicating the position of the measuring probe relative to a fixedly disposed base unit.

The invention further provides a method for setting out contours, points or works, with a device comprising a measuring device provided with a movable measuring probe and a portable base unit provided with a rotatably supported elongate arm, which measuring probe is connected to the measuring device by means of a cord or a wire via the elongate arm. The measuring device is provided with sensors for measuring the length or a change in the length of the cord or the wire and rotation of the arm in at least one degree of freedom, and with a computer-controlled processing device connected to the sensors for processing measuring signals delivered by the sensors into position data of the measuring probe. The invention further provides a guiding device communicatively connected to the measuring device for providing guidance regarding the positioning of the measuring probe for the purpose of reducing a difference between a measured position of the measuring probe and a desired position of the measuring probe in accordance with a contour, point or work to be set out. The guiding device is provided with an indicating device indicating guidance for moving the measuring probe on the basis of the difference between a measured position of the measuring probe and a desired position of the measuring probe in accordance with a contour, point or work to be set out. The device further comprises a storage device for loading and storing data representative of a contour, point or work to be set out therein, and a calculating device for calculating the difference between the position of the measuring probe as measured by the measuring device and the desired position of the measuring probe in accordance with the loaded data of a contour, point or work to be set out. The method comprises the steps of:

a) loading data representative of a contour, point or work to be set out into a global coordinate system, which data comprise at least two known independent reference positions, b) calibrating a measuring coordinate system, c) calculating coordinate transformation values for transforming positions between the global coordinate system and the measuring coordinate system, d) selecting, from the loaded data, a position of a contour, point or work to be set out as a desired position of the measuring probe, e) measuring a current position of the measuring probe in at least two independent coordinates, f) calculating a difference between the measured current position and a desired position of the measuring probe in accordance with the calculated coordinate transformation values, g) indicating the calculated difference by means of the guiding device in the form of guidance for moving the measuring probe, h) repeating steps e) through g) until the difference is lower than a predetermined threshold value, and i) repeating steps d) through h) for various points of the contour, points or the work to be set out.

A designer or architect will draft the contour to be set out or the point or the work to be set out in a coordinate system suitable for the project in question, for example a cylindrical coordinate system for building a round tube, a round tunnel or the like. The coordinate system to which the data to be loaded refer is called the global coordinate system herein.

Depending on the construction of the measuring device, the device measures the position of the measuring probe in a spherical coordinate system, for example, in the case of a measuring device for measuring positions in three dimensions. The coordinate system in which measuring by the measuring device takes place is called he measuring coordinate system herein.

For calibration purposes it is necessary to calibrate the measuring system with known independent spatial reference positions contained in the loaded data. In fact, the position of the measuring probe must to that end be measured at two or three independent reference positions for a two-dimensional project or a three-dimensional project, respectively. It is possible, however, to reduce this number if the device comprises components with which it can be horizontally or vertically aligned, for example, whether or not in an automated manner using suitable sensors, in a situation in which, for example, a part of a work or a contour, point to be set out also falls in a horizontal or vertical plane. The device may for example also be configured so that a horizontal and/or a vertical reference plane, for example, is determined by means of sensors incorporated in the measuring device, with the measuring coordinate system in the processing software being attached to a thus determined reference plane.

Then a transformation of the measured reference position or positions in the measuring coordinate system into the known reference position or positions in the global coordinate system can be calculated, using known trigonometric relations. Using the coordinate transformation values calculated therefrom, every point of a contour a work or points to be set out in the global coordinate system can be related to a corresponding point in the measuring coordinate system, and conversely, irrespective of the type of coordinate system in which measuring by the measuring device takes place. The reference positions must be independent, i.e. they must define a two- or three-dimensional space, for a two-dimensional project or a three-dimensional project, respectively.

It will be understood that if the loaded data and the measuring device operate in the same coordinate system, for example a Cartesian coordinate system, the coordinate transformation values are represented by a vector that maps the origins of the two coordinate systems. For each individual coordinate of the system, the coordinate transformation value in question is in that case a distance and/or direction that must be subtracted from or added to the respective coordinate of a position in the global system in order to arrive at the corresponding position in the measuring system, or conversely.

For the sake of accuracy, and depending on the complexity and size of a contour, points or work to be set out, it may be necessary to (re)position the base unit of the device a number of times on the basis of various reference positions during the setting out of the contour, the points or the work.

The skilled person will appreciate that a number of steps may be carried out in a different order than described in the foregoing. Steps c) and d) may be exchanged, for example, but also steps d) and e) may be exchanged, etc.

After the reference measurement or reference measurements has (have) been carried out, a user will be guided to a desired position of the measuring probe via the guiding device, wherein the current position of the measuring probe is measured while it the measuring probe is being moved and wherein the user is provided guidance, via the guiding device, for moving the measuring probe in two or three directions on the basis of the calculated difference between the current position and the desired position of the measuring probe. Once the calculated difference is lower than a predetermined threshold value, as explained in the foregoing, the user may be given a visible, audible or sensible signal, on the basis of which the user can place a mark on an object or in the space, for example a peg, a chalk line or a paint line or otherwise, so as to mark a position determined in accordance with the contour, the point or the work to be set out. These steps are repeated until the contour, the point or the work has been set out with the required degree of precision.

In embodiments of the method according to the invention, the guidance may be indicated in the form of direction information for moving the measuring probe, among which audio direction information, optical direction information, graphic direction information, tactile direction information. In an embodiment, the guiding device displays the guidance for moving the measuring probe in relation to an image representing the cord or the wire, such as a line. By determining the relative position of the guiding device with respect to at least one of the base unit or the measuring probe and indicating the guidance for moving the measuring probe in relation to the determined relative position, it is possible to realise an automatic, dynamic alignment of the representation with the cord or the wire of the measuring device.

In another embodiment, the guiding device can indicate the guidance in relation to a representation of a contour, point or work to be set out, or in relation to reference positions of a contour, point or work to be set out. The same applies with regard to the measured current position of the measuring probe. In an embodiment of a three-dimensional measuring device, the guiding device can indicate the guidance in a two-dimensional partial representation of a contour, point or work to be set out.

A contour or a work may be set out point by point. The step of selecting a point of or a position on a contour or work to be set out or various points to be set out can be carried out automatically by the measuring device once the calculated difference between the current position and the desired position of the measuring probe is lower than a predetermined threshold value. In another embodiment, the selection of a new desired position of the measuring probe is carried out from the guiding device. The user can in that case choose from a number of predetermined positions, for example, or determine the new position entirely by himself. In both cases the user may first have to confirm to the device that the measuring probe has reached the desired position, whereupon a new position can be selected.

The confirmation and selection of a position of the measuring probe may be done by means of hard or soft (software) keys, cursor control on a display, a touch pen or a pointer pen etc, as already mentioned in the foregoing.

Preferably, the difference between the current position of the measuring probe and the desired position thereof is measured quasi-continuously in real time, so that a user is guided to a desired position for placing the measuring probe in a quasi-continuous manner. The directions in which the user is guided by the guiding device can be provided in any desired coordinate system, called the guidance coordinate system herein, independently of the global coordinate system and independently of the measuring coordinate system. The guidance coordinate system is preferably selected so that it fits in with the local, actual situation in which the contour, a point or the work is to be set out in a manner that is most intuitive to the user.

Because use is made of a measuring device which is capable of measuring the spatial position of a measuring probe, results measured by the measuring device can be added to the loaded data in another embodiment of the method. Using the added data, any differences between the practical, actual situation and the loaded data can then be corrected or processed and be integrated in the respective data of the contour, the point or the work.

Measuring a realised contour, points or work once again by means of the measuring device after the realisation of a project provides a quality check as regards the quality with which the setting out has taken place.

The invention also relates to a measuring device and to a directing for use in the device or the method as discussed in the foregoing.

The guiding device is provided with an indicating device for providing guidance for moving a measuring probe of a device for setting out contours, points or works, which device comprises a measuring device and a portable base unit provided with a rotatably supported elongate arm, which measuring probe is connected to the measuring device by means of a cord or a wire via the elongate arm. The measuring device is provided with sensors for measuring a length or a change in the length of the cord or the wire and rotation of the arm in at least one degree of freedom, and with a computer-controlled processing device connected to the sensors for processing measuring signals delivered by the sensors into position data of the measuring probe. The guiding device is designed for being communicatively connected to the measuring device for providing guidance regarding the positioning of the measuring probe for the purpose of reducing a difference between a measured position of the measuring probe and a desired position of the measuring probe in accordance with a contour, point or work to be set out.

In an embodiment of the guiding device, the indicating device is provided with a graphic display screen, being designed for displaying an image representing the cord or the wire, such as a line, on the display screen in use and for displaying the directions for moving the measuring probe in relation to this image.

In another embodiment of the guiding device, the indicating device comprises a position determining device for determining a relative position of the guiding device with respect to at least one of the base unit and the measuring probe of the measuring device, wherein the indicating device is provided with a graphic display screen for displaying the guidance on the display screen in relation to the determined relative position.

The invention will now be explained in more detail with reference to the appended figures, which only serve to illustrate the invention and which must not be construed as being limitative.

DETAILED DESCRIPTION

Figure 1:
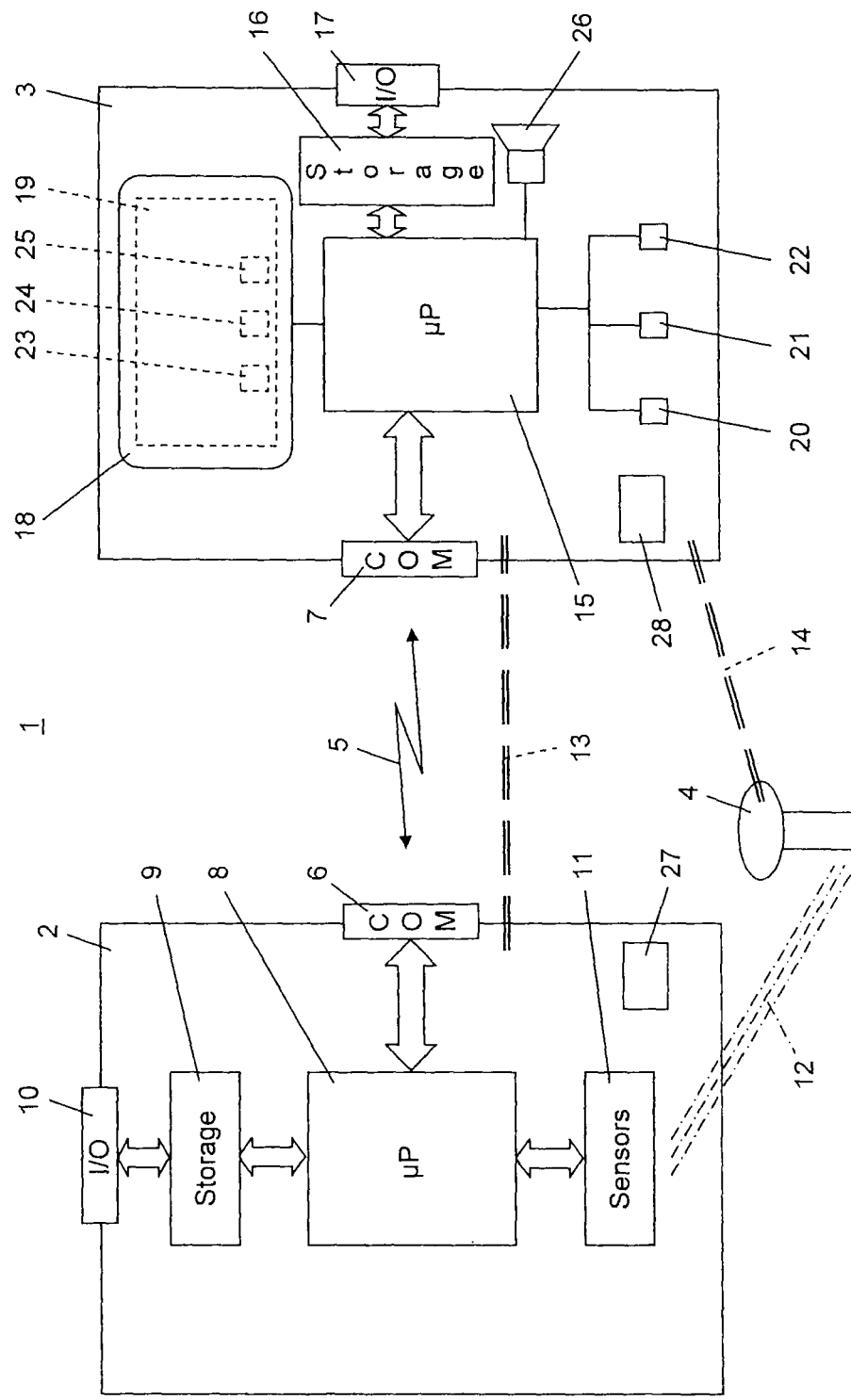
FIG. 1 shows in block diagram form an embodiment of the device according to the invention.

FIG. 1 shows in block diagram form an embodiment of a computer-controlled device 1 according to the invention for setting out contours, points or works. The device 1 comprises a measuring device 2, a guiding device 3 and a measuring probe 4. As discussed in the introduction, a measuring device 2 suitable for use in the device 1 is known from European patent No. 1 226 401 in the name of the present applicant, the entire content of which is to be considered incorporated herein.

The measuring device 2 and the guiding device 3 are provided with communication interfaces 6, 7 for exchanging data via a data communication link 5. The data communication link 5 and the data communication interfaces 6, 7 are preferably designed as short-range, for example a few dozen metres, wireless data communication links, such as a radio link, an infrared link or the like. The data transfer can take place according to any known protocol, for example via the Bluetooth protocol. It is also possible to use a wire-based data communication link 5.

The measuring device 2 comprises a computer-controlled processing device 8, such as a microprocessor or microcomputer, which is connected to the communication interface 6 for exchanging data with the guiding device 3. The measuring device 2 further comprises a storage or memory device 9 connected to the processing device 8 for loading data of a contour, points or a work to be set out via a data input/output interface 10. Depending on the construction of the measuring device 2, the measuring device may be suitable for carrying out measurements in two or three dimensions. The measuring device 2 is provided with a sensor device 11 for measuring the position of the measuring probe 4 in two or three independent coordinates 12, which sensor device is likewise connected to the processing device 8.

In a preferred embodiment of the invention, the guiding device 3 likewise comprises a computer-controlled processing device 15, such as a microprocessor or microcomputer, which is connected to the communication interface 7 for exchanging data with the measuring device 2, and a storage or memory device 16 connected to the processing device 15 for loading data of a contour, a point or points or a work to be set out via an input/output interface 17. The guiding device 3 further comprises an indicating device 18 for giving a user guidance for moving the measuring probe 4 in two or three directions.

The indicating device 18 may have any form suitable for providing guidance, such as an audio generator for generating and audibly reproducing various audio guidance signals, a speech generator for generating and audibly reproducing spoken guidance, an optical indicating device, such as various LEDs, for giving optical guidance signals, and/or a graphic display screen 19 for graphically providing guidance, for example in the form of arrows, text, colours, etc. Furthermore, the indicating device 18 may comprise one or more vibrators for giving tactile guidance in the form of various vibration signals.

The guidance to the user relates to the direction for moving the measuring probe, whilst in a preferred embodiment also the distance along which the measuring probe is to be moved in a respective direction is likewise indicated. For example, when audio signals are used, a separate tone may be used for each direction, with the rhythm in which the tone is reproduced being a measure of the distance to be covered. When optical signals are used, each direction may be indicated by its own colour, with the blinking frequency being a measure of the distance, for example. In the case of speech, the guidance may be given in a language to be selected, for example. When a graphic display screen 19 is used, the guidance may be directly given in graphic form, for example as direction arrows or the like, in which case the form, the colour, the length etc of an arrow may vary in dependence on the distance from the current position of the measuring probe to the desired position. Furthermore, the guidance may be displayed in a representation of and/or in relation to reference points of a contour, point or work to be set out, in which case also the measured current position of the measuring probe 4 and the desired position of the measuring probe, for example, will be indicated on the display screen, for example in the form of a dot, a cross, a sphere, a star or the like. This makes it possible to fine-tune the positioning of the measuring probe 4. The position of the measuring probe 4 in relation to the contour, the point or the work can implicitly provide displacement information.

In the extended embodiment, the guiding device 3 comprises a device for confirming a position of the measuring probe 4 when the current position of the measuring probe 4 corresponds to the desired position within a predetermined threshold, and a device for selecting a (new) desired position of the measuring probe 4 in accordance with the contour, the point or the work to be set out. The devices may consist of keys that can be operated by the user, among which fixed pushbuttons 20, 21, so-called hard keys, or keys 23, 24 displayed on the display screen 19, so-called soft keys, which can be operated via a cursor and a cursor control device 22, 25. Various other devices are available to the skilled person, of course, such as a touchscreen 19 in combination with a touch pen or pointer pen (not shown) or the like.

The guiding device 3 may furthermore be provided with a signalling device 26, for example for audibly signalling to a user that the current position of the measuring probe 4 corresponds to the desired position of the measuring probe 4. It will be understood that, depending on the configuration of the indicating device 18, this can be also be realised either acoustically or optically, or both, via the indicating device 18.

In the embodiment of the device as described above, both the measuring device 2 and the guiding device 3 are provided with a computer-controlled processing device 8, 15, respectively, and with a data storage device 9, 16, respectively. It will be understood that the data communication link 5 makes it possible for the position data measured by the measuring device 2 to be processed by the processing device 15 in the guiding device 3, wherein the data of a contour, point or work to be set out can be stored in the data storage device 16 of the guiding device 3. The guiding device 3 may be provided with suitable software for executing the required calculations and control commands, etc.

Conversely, the skilled person will appreciate that if use is made of a measuring device 2 as described above, the guiding device 3 can be of very simple design, for example only comprising the data communication interface 7, the indicating device 18 and, for example, the devices 20 and 21, in which case the processing device 8 of the measuring device 2 will be provided with suitable software for executing the required calculations and control commands, etc. The invention as defined in the appended claims further comprises any intermediate form.

It is noted that the guiding device 3 may be entirely or partially incorporated in the measuring device 2, as is schematically indicated by means of a double broken line 13 in FIG. 1.

Figure 2:
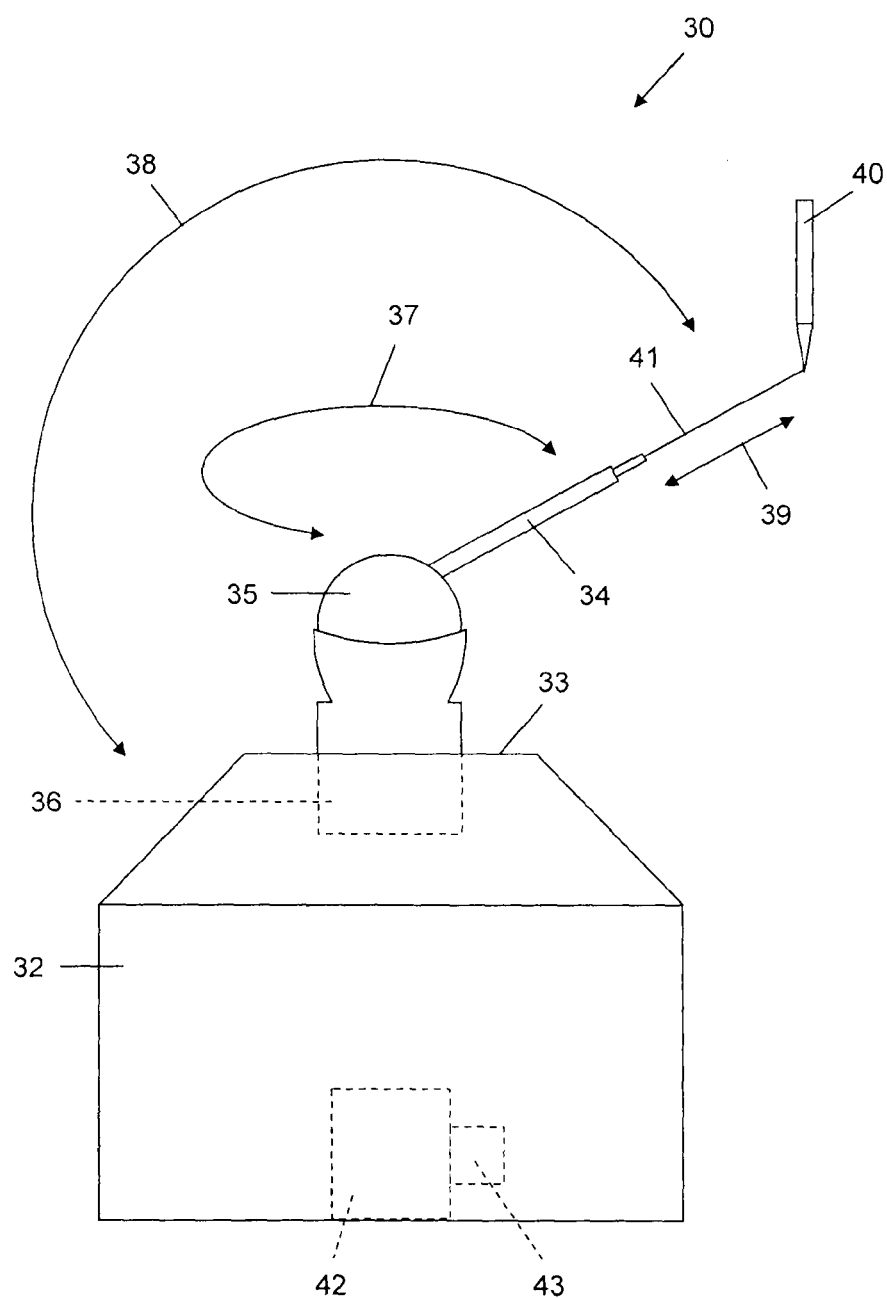
FIG. 2 is a schematic, illustrative view of a known measuring device for carrying out measurements in three independent, coordinates.

FIG. 2 schematically shows an embodiment of a measuring device 30, which is known by the trade name Proliner®, as described in European patent No. 1 226 401 in the name of the present applicant, comprising a portable base unit 31 with a housing 32, which is trapezoidal in shape, for example. The measuring device shown in FIG. 2 is suitable for carrying out spatial measurements in three dimensions. For the present invention, for example when setting out contours or points on a surface or an object, it is also possible to use a similar measuring device for only two dimensions, the principle of which is likewise described in European patent No. 1 226 401. Hereinafter, the invention will be explained on the basis of the most extensive three-dimensional embodiment of the measuring device 30.

Disposed on the upper surface 33 of the housing 32 is an arm 34, which is supported for pivoting movement in two degrees of freedom. The arm 44 is to that end pivotally mounted at one end, for example by means of a ball joint 35. In the housing 32, a sensor 36 is connected either to the arm 34 or to the ball joint 35 for measuring the movements or rotation of the arm 34 in two independent coordinates (degrees of freedom). The sensor 36 may consist of two independently operating sensors, if desired, one for each independent measuring coordinate. The measuring coordinates of the sensor 36 are indicated by arrows 37 and 38, respectively. The arrow 37 represents movements of the arm 34 in an imaginary plane parallel to the upper surface of the housing 32, which can be called the azimuth plane, and the arrow 38 represents movements of the arm 34 in an imaginary plane perpendicular to the housing 32, which can be called the elevation plane.

The measuring device 31 comprises a movable measuring probe 40, which is movably connected to the base unit 32 at a pointed end via a cord or a wire 41 extending through the arm 34. The length of the cord or the wire 41 may vary, as indicated by means of the arrow 39. The base unit 32 is to that end provided with a winding mechanism for the cord or the wire, schematically indicated by block 42. Connected to the winding mechanism 42 is a sensor 43 for measuring the length or changes in length of the cord or the wire 41. The sensor 36 and the sensor 43 form the sensor device 11, as discussed in the foregoing in relation to FIG. 1.

The base unit 32 further comprises a computer-controlled processing device 8 (not shown), a data storage device 9 provided with a data input/output interface 10, and a data communication interface 6 as discussed in the foregoing in relation to FIG. 1.

In use, the spatial position of the pointed end of the measuring probe 40 is measured in three independent coordinates relative to the base unit 31 in a measuring coordinate system of the measuring device 30. In the embodiment under discussion, the measuring device 30 carries out measurements in a spherical coordinate system.

A device operating on the basis of the same principle as the Proliner® is known from U.S. Pat. No. 7,395,609 B2. This known device can be used in a similar manner in relation to the invention disclosed herein as described herein with regard to the Proliner®.

Figure 3:
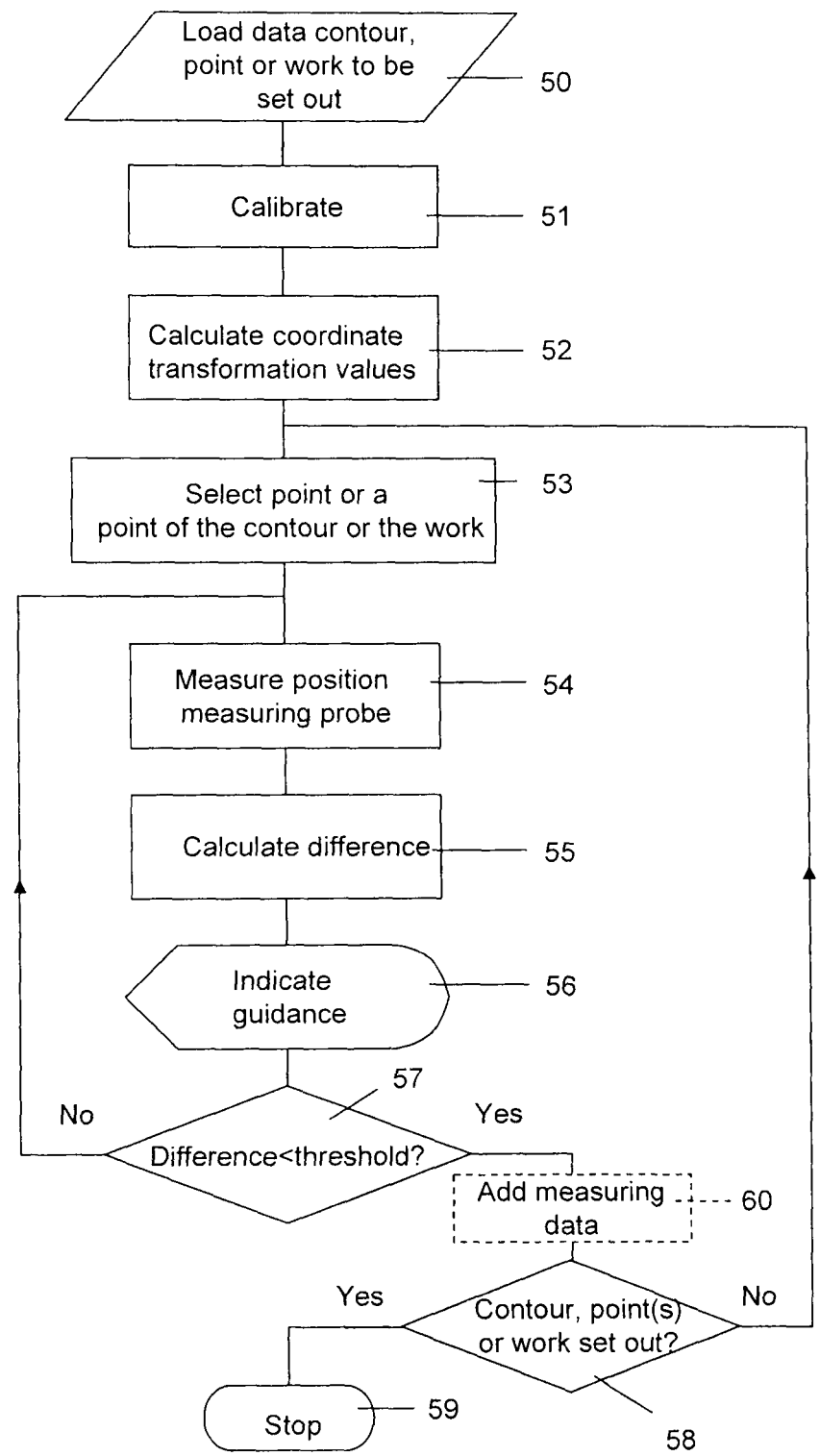
FIG. 3 shows in flow diagram form an embodiment of the method according to the invention.
Figure 4:
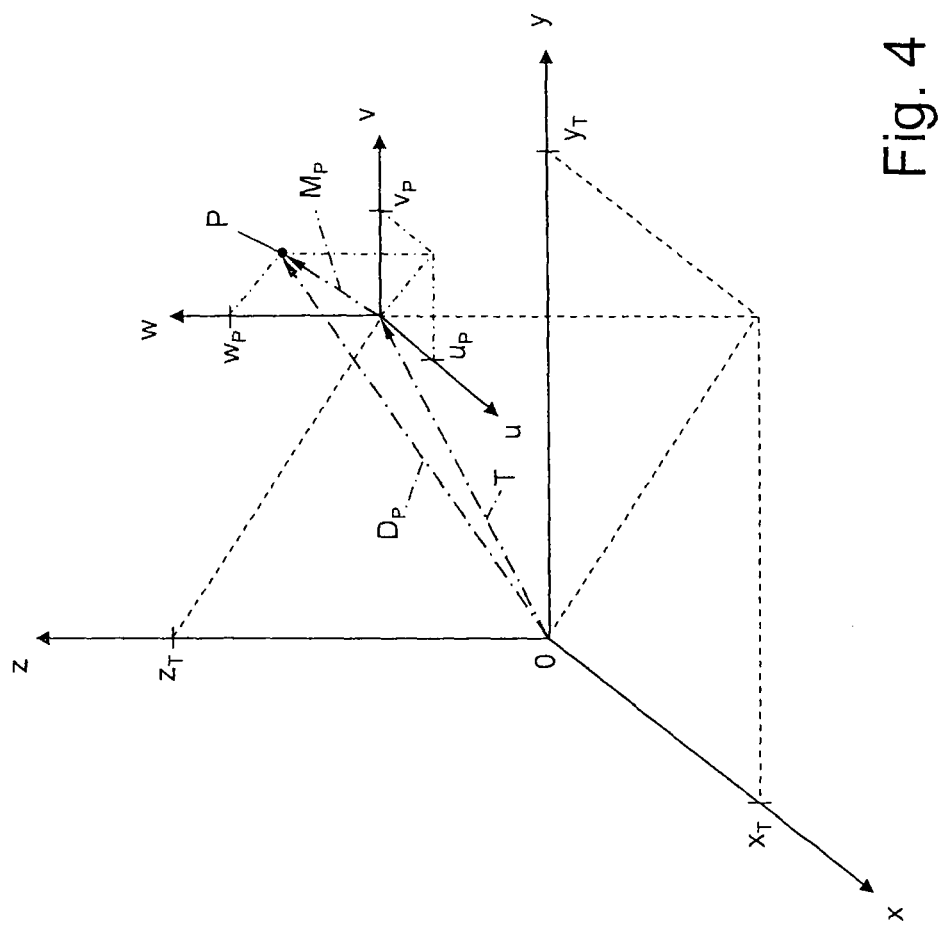
FIG. 4 is a graphical representation illustrating coordinate transformation.

The method according to the invention will now be schematically illustrated on the basis of the flow diagram shown in FIG. 3 and the graphic representation shown in FIG. 4. The steps shown in the flow diagram are carried out from top to bottom, seen in time, unless indicated otherwise by a respective arrow.

The process of setting out starts with the loading of data of a (spatial) contour, point or points or a spatial work to be set out into the data storage device 9 of the measuring device 2 and/or the data storage device 16 of the guiding device 3, step 50 "Load data contour, point or work to be set out". These data represent the contour, a point or the work in a three-dimensional global coordinate system such as, for example, a Cartesian coordinate system, a spherical coordinate system or a cylindrical coordinate system. In the case of a two-dimensional embodiment, the data to be loaded represent the contour of point(s) in a two-dimensional global coordinate system.

The measuring device 1 is then set up in the space or the area or the object where the setting out of the contour, the point(s) or the work is to take place. Examples of contours or works have been mentioned in the introduction. The measuring device 2 must be calibrated in the space or the area in which it is set up, step 51 "Calibrate". Calibration can take place in various ways, which may depend in turn on the kind of measuring device used for carrying out the measurements.

In a three-dimensional embodiment, the measuring probe 4 is first positioned at least three independent reference points (at least two in the case of a two-dimensional project). These reference points are contained in the loaded data and marked in the field or the space or on the object. These reference points are independent if they span a three-dimensional space (or a two-dimensional plane in the case of a two-dimensional project). The measuring device 1 measures the position of the measuring probe 4 at the reference points in its measuring coordinate system. Using known trigonometric calculations, a suitably programmed processing device 8 and/or 15 can now calculate coordinate transformation values for transforming a position in the measuring coordinate system to a position in the global coordinate system, step 52 "Calculate coordinate transformation values".

It is noted that the number of reference positions to be measured is at least three (or two). The reference or calibration measurements can be supported, however, or fewer reference positions need to be measured, if the measuring device can be aligned horizontally, for example, or vertically, for example, with a horizontal or vertical plane of an object or a work to be set out. Setting the measuring device horizontal or, for example, vertical can take place automatically or manually.

In another embodiment, the measuring device 1 may be provided with suitable sensors, such as a klinometer, which automatically determine a horizontal or vertical reference plane. Using suitable processing software in the processing device 8, the measuring coordinate system is in that case attached to a thus determined reference plane.

After that, setting out can be started. To that end, a point to be set out or a point of a contour or the work to be set out is selected either automatically by the measuring device 2 or the guiding device 3 or under the control of a user, step 53 "Select point or a point of the contour or the work". In the situation in which it is the user who selects a point, this may advantageously take place from the guiding device 3, for example, in a representation of the point(s), the contour or the work to be set out on a display screen 19, using selecting devices 20-25 as described in the foregoing in relation to FIG. 1. The selected point is the desired position of the measuring probe 4.

Now the current position of the measuring probe 4 is measured in real time in three independent coordinates, preferably quasi-continuously, by the measuring device 2, step 54 "Measure position measuring probe". Then the difference between the measured current position of the measuring probe and the desired position of the measuring probe is calculated in three coordinates by the processing device 8 and/or 15, step 55 "Calculate difference". Trigonometric calculations are used for this calculation, taking into account the coordinate transformation values determined in step 52, the type of measuring coordinate system and the type of global coordinate system.

Based on the calculated difference, guidance for moving the measuring probe 4 is given via the indicating device 18 of the guiding device 3, step 56 "Indicate guidance", so as to position the measuring probe 4 at or as close to the selected desired position as possible. Various ways of providing guidance have already been discussed in the foregoing. It is in particular noted in this regard that the directions can be indicated in a guidance coordinate system, which may be different from the measuring coordinate system and the global coordinate system. The transformation to a suitable guidance coordinate system can be carried out by the processing device 15, for example. This step may also comprise the displaying of the current measured position of the measuring probe 4 on a display screen.

Steps 54, 55 and 56 are repeated until the calculated difference is higher than a predetermined threshold value, i.e. until the answer to the comparison "Difference<threshold?" in decision block 57 is "no". If the answer is "yes", it may be concluded that the current position of the measuring probe 4 corresponds to the desired, selected position. The user can then mark the respective position of the measuring probe in the space or the work.

The method may now either automatically proceed with the selection of a next, for example pre-programmed, new point to be set out or a new point of the contour or the work to be set out, or confirmation by the user may be required first, for example via the devices 20-25 of the guiding device 3. As explained above, the user may also manually select a point of the contour, the point preferable the work himself, for example.

Then it is verified in decision block 58 whether all the points or a predetermined number of points of the contour, the point or the work needed for suitably setting out the contour, the point(s) or the work have been selected, "Contour, point (s) or work set out?".

If "no", the method will proceed from step 53 again. If "yes", setting out is complete and the method can be stopped, step 59, "Stop".

Measured positions of the measuring probe 4 that differ from the desired position, for example, may be added to the loaded data. New positions may be added to the loaded data as well, taking into account of course the determined coordinate transformation values and the coordinate system as explained in the foregoing. All this as schematically illustrated in optional block 60 "Add measuring data". It will be understood that various (sub)steps of the method may be carried out in a different order than in the foregoing. Steps 52 and 53 or 53 and 54, for example, may be interchanged in time.

When setting out is complete, a measurement may be carried out by means of the measuring device, if desired, to check the setting out, which may be desired for quality purposes.

FIG. 4 is a schematic, graphic view of a coordinate transformation between the measuring coordinate system u, v, w and the global coordinate system x, y, z. For the sake of clarity, both the measuring coordinate system and the global coordinate system are shown as Cartesian systems.

The measured position P in the measuring coordinate system, represented by the vector $M_p$ with components $u_p, v_p, w_p$ is transformed via the coordinate transformation vector T with components $x_T, y_T, z_T$ to the corresponding position in the global coordinate system x, y, z represented by vector $D_p$. The vector T is calculated from the measured reference points.

Figure 5:
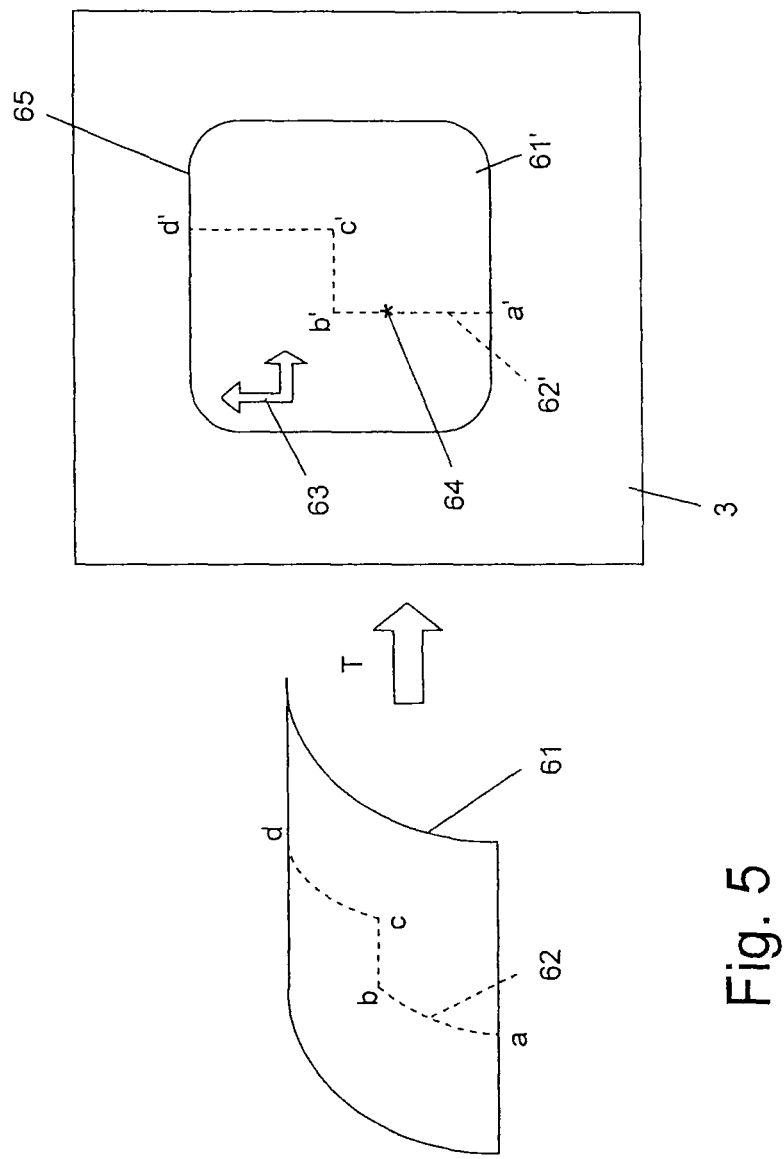
FIG. 5 schematically shows a transformation of a (part of a) contour, point or work to be set out into a two-dimensional representation on a display screen of a guiding device.

In a preferred embodiment, the guiding device 3 is so designed that a contour, point or a work or a part of a contour, point or a work is displayed in a two-dimensional partial representation on a display screen 65 of the guiding device 3, as is schematically illustrated in FIG. 5.

Reference numeral 61 indicates a curved wall of a tunnel, on which a contour, point 62 is to be set out. The points indicated a, b, c, d lie on the curved contour, point 62. A user who is to set out the contour, the point 62 will perceive the wall 61 as a flat surface when standing in front of this wall. In such a situation providing guidance in a representation of the wall 61, as in the left-hand part of FIG. 5, which is a representation in a Cartesian coordinate system, for example, with the data being loaded in the measuring device or the guiding device, does not appeal to that which is perceived by the user on site.

However, by making use of the coordinate transformation, schematically indicated by the double arrow T in FIG. 5, in which the curved wall 61 is represented in a cylindrical coordinate system on the guiding device, the user perceives the wall 61 as a flat, two-dimensional representation 61', and the curved contour, point 62 appears as a contour, point 62' built up of straight lines. Points a', b', c', d' correspond to points a, b, c, d.

Reference numeral 64 indicates the current measured position of the measuring probe 4, represented in the form of a star. From the right-hand part of FIG. 5 it can be derived that the guidance for moving the measuring probe 4 can be given in two independent directions 63, which, to a user, intuitively corresponds to that which he or she perceives on site.

Different parts of a contour, point 4 or work to be set out can be represented in different two-dimensional partial representations, using different coordinate transformations, if necessary. Switchover points may be included in the loaded data, at which the guiding device will automatically switch over to an(other) two-dimensional representation. For example, when the measuring probe 4 reaches point a, the guiding device can automatically switch over to the representation shown in the right-hand part of FIG. 5. The switching over can also be done manually by a user, of course, if this is preferable.

It is noted that the measurement is carried out in three dimensions by the measuring device and that only the representation of the guiding device takes place in two dimensions.

Figure 6:
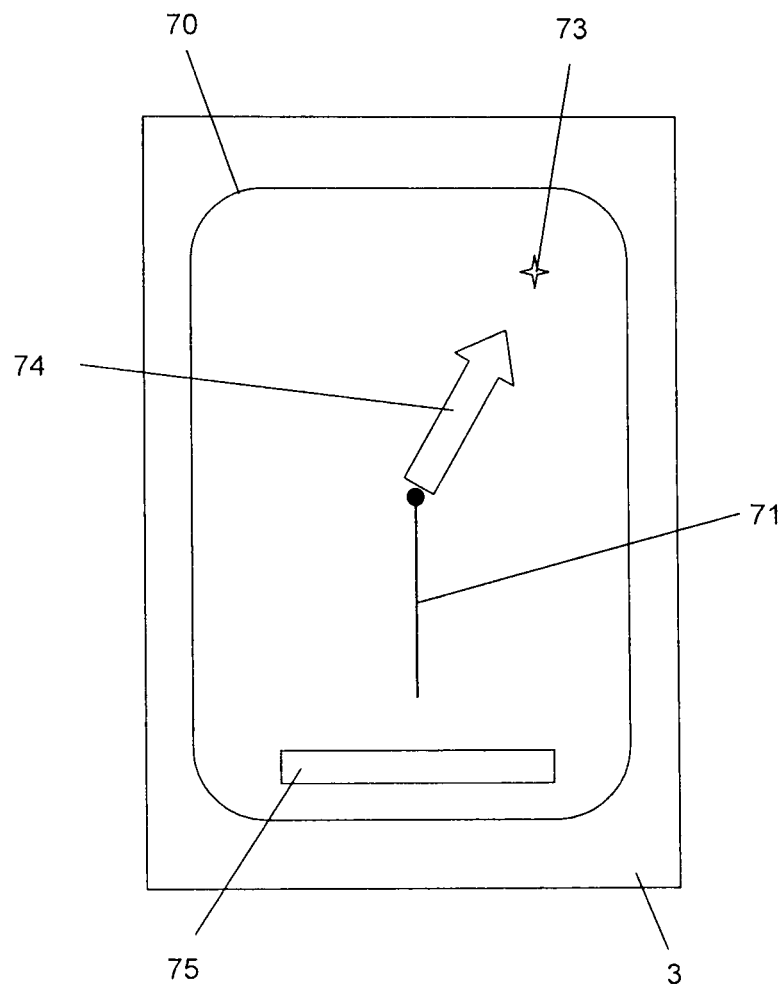
FIG. 6 is a schematic, illustrative view of an embodiment of a graphic representation of guidance on a display screen of a guiding device.

FIG. 6 schematically illustrates an embodiment of the guiding device 3 in which the indicating device of the guiding device is provided as a graphic display screen 70, being designed for displaying an image 71 representing the cord or the wire 41 on the display screen 70 in use. In the embodiment as shown, the representation 71 is a full line. It will be understood that this line may also be a broken line or built up of dots or the like. In this embodiment, the representation 71 of the cord or the wire 41 has a fixed position on the display screen 70. One end of the representation 71 coincides with or blend into a representation of the measuring probe 4, 40 on the display screen 70, for example in the form of a dot 72. A star 73 indicates a desired position of the measuring probe 4, 40.

The displacement guidance are direction indications, for example an arrow 74, which, based on the representation 71 of the cord or the wire, such as the aforesaid straight line, indicates the direction of movement of the measuring probe 4, 40 towards the desired point 73. In addition to that, displacement information may also be displayed in a unit of measurement, such as mm, cm, m, degrees, using digits or graphic representations, such as measuring beams, for example, schematically indicated at 75.

During the process of setting out, the user can then readily determine the extent and the direction of the displacement of the measuring probe 4, 40 and carry out the displacement, for example by aligning the representation 71 of the cord or the wire displayed on the display screen with the actual cord or wire 41 of the measuring device 30.

In a more advanced embodiment, the device comprises a position determining device for determining a relative position of the guiding device with respect to at least one of the base unit and the measuring probe of the measuring device, wherein the indicating device of the guiding device is provided with a graphic display screen for displaying the guidance on the display screen in relation to the determined relative position. In FIG. 1 this is schematically indicated at 27, 28.

By determining the relative position of the guiding device 3 with respect to either the measuring probe 4, 40 or the base unit 32 of the measuring device 2, 30 continuously or quasi-continuously in real time during the setting out it is possible to align the guidance displayed on the display screen 70 automatically or dynamically with, for example, the cord or the wire 41 of the measuring device 30, so that the user need not place the guiding device 3 in a position aligned with the cord or the wire himself all the time for correctly interpreting the direction information being displayed. The direction information will in that case also follow position changes of the guiding device 3, of course, when the user holding the guiding device 3 changes the direction in which he is moving or the orientation of the guiding device, etc. In this embodiment the representation 71 of the cord or the wire 41 can also be shown on the display screen, as discussed in the foregoing. The orientation of the representation on the display screen 70 will in that case change with the orientation of the guiding device 3.

The relative position in question can be measured in various ways known to the skilled person or by using known techniques and devices 27, 28. For example, from absolute position measurements of the base unit and the guiding device by means of satellite position determining systems, such as GPS, for example, by means of position measuring systems incorporated in the base unit 30 and/or in the guiding device 3, which communicate with each other, by means of triangulation techniques, etc.

The invention is not limited to the examples discussed herein. Several modifications and additions can be realised by persons skilled in the art without departing from the scope of the invention as defined in the appended claims.

The invention claimed is:

1. A device for setting out contours, points or works, comprising a measuring device provided with a movable measuring probe and a portable base unit provided with a rotatably supported elongate arm, wherein the measuring probe is connected to the measuring device by means of a cord or a wire via the elongate arm and the measuring device is provided with sensors for measuring length or a change in length of the cord or the wire and rotation of the arm in at least one degree of freedom, and with a computer-controlled processing device connected to the sensors for processing measuring signals delivered by the sensors into position data of the measuring probe, a guiding device communicatively connected to the measuring device for providing guidance regarding positioning of the measuring probe for the purpose of reducing a difference between a measured position of the measuring probe and a desired position of the measuring probe in accordance with a contour, point or work to be set out, wherein the guiding device is provided with an indicating device for providing guidance for moving the measuring probe based on a difference between a measured position of the measuring probe as measured by the measuring device and a desired position of the measuring probe in accordance with a contour, point or work to be set out.

2. A device according to claim 1, wherein the measuring device comprises a storage device for loading and storing data representative of a contour, point or work to be set out therein, and a calculating device for calculating the difference between the position of the measuring probe as measured by the measuring device and the desired position of the measuring probe in accordance with the loaded data of a contour, point or work to be set out.

3. A device according to claim 1, wherein the guiding device is incorporated in the measuring device.

4. A device according to claim 1, wherein the guiding device comprises a storage device for loading and storing data representative of a contour, point or work to be set out therein, and a calculating device for calculating the difference between the position of the measuring probe as measured by the measuring device and the desired position of the measuring probe in accordance with the data loaded in the storage device regarding a contour, point or work to be set out.

5. A device according to claim 1, wherein the indicating device of the guiding device is designed for providing guidance for moving the measuring probe in the form of direction information.

6. A device according to claim 1, wherein the indicating device of the guiding device is designed for providing guidance for moving the measuring probe in the form of direction information, using at least one of the group comprising:
   audio direction information;
   optical direction information;
   graphic direction information;
   tactile direction information.

7. A device according to claim 1, wherein the indicating device of the guiding device is provided with a graphic display screen, being designed for displaying an image representing the cord or the wire on the display screen and for displaying the guidance for moving the measuring probe in relation to said image.

8. A device according to claim 1, comprising a position determining device for determining a relative position of the guiding device with respect to at least one of the base unit and the measuring probe of the measuring device, wherein the indicating device of the guiding device is provided with a graphic display screen for displaying the guidance on the display screen in relation to the determined relative position.

9. A device according to claim 1, wherein the indicating device of the guiding device is provided with a graphic display screen for providing the guidance on the display screen in relation to a representation of a contour, point or work to be set out.

10. A device according to claim 1, wherein the indicating device of the guiding device is provided with a graphic display screen for providing the guidance on the display screen in relation to reference positions of a contour, point or work to be set out.

11. A device according to claim 1, wherein the indicating device of the guiding device is designed for providing guidance in a coordinate system that is to be selected.

12. A device according to claim 1, wherein the indicating device of the guiding device is designed for providing guidance for moving the measuring probe in two independent directions in a two-dimensional partial representation.

13. A device according to claim 1, wherein the guiding device comprises a signalling device for signalling to the user that said difference is lower than a predetermined threshold value.

14. A device according to claim 1, wherein the guiding device comprises a device for confirming and selecting a position of the measuring probe in accordance with a contour, point or work to be set out.

15. A device according to claim 1, wherein the guiding device is communicatively coupled to the measuring device by wireless means.

16. A device according to claim 1, wherein the measuring probe and the guiding device are combined into one portable unit.

17. A device according to claim 1, wherein the computer-controlled processing device for processing measuring signals delivered by the sensors into position data of the measuring probe is incorporated in the guiding device, and wherein the guiding device is designed for indicating the position of the measuring probe relative to a fixedly disposed base unit in at least two independent coordinates.

18. A method for setting out contours, points or works, using a device comprising a measuring device provided with a movable measuring probe and a portable base unit provided with a rotatably supported elongate arm, wherein the measuring probe is connected to the measuring device by means of a cord or a wire via the elongate arm and the measuring device is provided with sensors for measuring length or a change in length of the cord or the wire and rotation of the arm in at least one degree of freedom, with a computer-controlled processing device connected to the sensors for processing measuring signals delivered by the sensors into position data of the measuring probe, and with a guiding device communicatively connected to the measuring device for providing guidance regarding positioning of the measuring probe for the purpose of reducing a difference between a measured position of the measuring probe and a desired position of the measuring probe in accordance with a contour, point or work to be set out, wherein the guiding device is provided with an indicating device for providing guidance for moving the measuring probe on the basis of a difference between a measured position of the measuring probe as measured by the measuring device and a desired position of the measuring probe in accordance with a contour, point or work to be set out, further comprising a storage device for loading and storing data representative of a contour, point or work to be set out therein, and a calculating device for calculating the difference between the position of the measuring probe as measured by the measuring device and the desired position of the measuring probe in accordance with the loaded data of the contour, point or work to be set out, which method comprises the steps of:

a) loading data representative of a contour, point or work to be set out into a global coordinate system, which data comprise at least two known independent reference positions,
b) calibrating a measuring coordinate system,
c) calculating coordinate transformation values for transforming positions between the global coordinate system and the measuring coordinate system,
d) selecting, from the loaded data, a position of a contour, point or work to be set out as a desired position of the measuring probe,
e) measuring a current position of the measuring probe in at least two independent coordinates,
f) calculating a difference between the measured current position and a desired position of the measuring probe in accordance with the calculated coordinate transformation values,
g) indicating the calculated difference by means of the guiding device in the form of guidance for moving the measuring probe,
h) repeating steps e) through g) until said difference is lower than a predetermined threshold value, and
i) repeating steps d) through h) for various points of a contour, points or a work to be set out.

19. A method according to claim 18, wherein step b) comprises measuring in at least two independent coordinates of the position of the measuring probe at known reference positions contained in the loaded data.

20. A method according to claim 18, wherein a signal is given when the calculated difference is lower than a predetermined threshold value.

21. A method according to claim 18, wherein step d) is carried out automatically by the measuring device.

22. A method according to claim 18, wherein step d) is carried out from the guiding device.

23. A method according to claim 18, wherein steps e) through h) are carried out in a quasi-continuous manner.

24. A method according to claim 18, wherein the guiding device indicates the guidance in the form of direction information for moving the measuring probe.

25. A method according to claim 18, wherein the guiding device indicates the guidance in the form of direction information for moving the measuring probe, using at least one of the group comprising:

audio direction information;
optical direction information;
graphic direction information;
tactile direction information.

26. A method according to claim 18, wherein the guiding device indicates the guidance for moving the measuring probe in relation to an image representing the cord or the wire.

27. A method according to claim 18, wherein a relative position of the guiding device with respect to at least one of the base unit and the measuring probe of the measuring device is determined, and wherein the guiding device indicates the guidance for moving the measuring probe in relation to the determined relative position.

28. A method according to claim 18, wherein the guiding device indicates the guidance in relation to a representation of a contour, point or work to be set out.

29. A method according to claim 18, wherein the guiding device indicates the guidance in relation to reference positions of a contour, point or work to be set out.

30. A method according to claim 18, wherein the measured current position of the measuring probe is indicated in relation to a representation of a contour, point or work to be set out.

31. A method according to claim 18, wherein the guiding device indicates the guidance in a two-dimensional partial representation of a contour, point or work to be set out.

32. A method according to claim 18, wherein results measured by means of the measuring device are added to the loaded data.

33. A guiding device provided with an indicating device for providing guidance for moving a measuring probe of a device for setting out contours, points or works, which device comprises a measuring device and a portable base unit provided with a rotatably supported elongate arm, wherein the measuring probe is connected to the measuring device by means of a cord or a wire via the elongate arm and the measuring device is provided with sensors for measuring a length or a change in length of the cord or the wire and rotation of the arm in at least one degree of freedom, and with a computer-controlled processing device connected to the sensors for processing measuring signals delivered by the sensors into position data of the measuring probe, wherein the guiding device is designed for being communicatively connected to the measuring device for providing guidance regarding positioning of the measuring probe for the purpose of reducing a difference between a measured position of the measuring probe and a desired position of the measuring probe in accordance with a contour, point or work to be set out.

34. A guiding device according to claim 33, wherein the indicating device of the guiding device is provided with a graphic display screen, being designed for displaying an image representing the cord or the wire on the display screen in use and for displaying the guidance for moving the measuring probe in relation to said image.

35. A guiding device according to claim 33, wherein the indicating device is provided with a position determining device for determining a relative position of the guiding device with respect to at least one of the base unit and the measuring probe of the measuring device, wherein the indicating device of the guiding device is provided with a graphic display screen for displaying the guidance on the display screen in relation to the determined relative position.

* * * * *